(12) United States Patent
Fu et al.

(10) Patent No.: US 12,205,317 B2
(45) Date of Patent: Jan. 21, 2025

(54) LIGHT-WEIGHT POSE ESTIMATION NETWORK WITH MULTI-SCALE HEATMAP FUSION

(71) Applicant: Northeastern University, Boston, MA (US)

(72) Inventors: Yun Fu, Newton, MA (US); Songyao Jiang, Everett, MA (US); Bin Sun, Everett, MA (US)

(73) Assignee: Northeastern University, Boston, MA (US)

( * ) Notice: Subject to any disclaimer, the term of this patent is extended or adjusted under 35 U.S.C. 154(b) by 358 days.

(21) Appl. No.: 17/759,939

(22) PCT Filed: Feb. 10, 2021

(86) PCT No.: PCT/US2021/017341
§ 371 (c)(1),
(2) Date: Aug. 2, 2022

(87) PCT Pub. No.: WO2021/163103
PCT Pub. Date: Aug. 19, 2021

(65) Prior Publication Data
US 2023/0126178 A1    Apr. 27, 2023

Related U.S. Application Data

(60) Provisional application No. 62/976,099, filed on Feb. 13, 2020.

(51) Int. Cl.
*G06T 7/70* (2017.01)
*G06T 7/73* (2017.01)
(Continued)

(52) U.S. Cl.
CPC ................ *G06T 7/70* (2017.01); *G06T 7/74* (2017.01); *G06V 10/454* (2022.01);
(Continued)

(58) Field of Classification Search
None
See application file for complete search history.

(56) References Cited

U.S. PATENT DOCUMENTS

2010/0034457 A1\* 2/2010 Berliner .................. G06T 7/246
382/154
2019/0357615 A1\* 11/2019 Koh ........................ G06T 17/10

FOREIGN PATENT DOCUMENTS

| CN | 109271933 A | 1/2019 | |
|---|---|---|---|
| CN | 109271933 B  \* | 11/2021 | ......... G06K 9/00208 |
| WO | 2021163103 A1 | 8/2021 | |

OTHER PUBLICATIONS

Cluster-wise learning network for multi-person pose estimation. Zhao et al. (Year: 2020).\*

(Continued)

*Primary Examiner* — Delomia L Gilliard
(74) *Attorney, Agent, or Firm* — Hamilton, Brook, Smith & Reynolds, P.C.

(57) ABSTRACT

Embodiments identify joints of a multi-limb body in an image. One such embodiment unifies depth of a plurality of multi-scale feature maps generated from an image of a multi-limb body to create a plurality of feature maps each having a same depth. In turn, for each of the plurality of feature maps having the same depth, an initial indication of one or more joints in the image is generated. The one or more joints are located at an interconnection of a limb to the multi-limb body or at an interconnection of a limb to another limb. To continue, a final indication of the one or more joints in the image is generated using each generated initial indication of the one or more joints.

20 Claims, 8 Drawing Sheets

(51) Int. Cl.
G06V 10/44 (2022.01)
G06V 10/77 (2022.01)
G06V 10/82 (2022.01)
G06V 20/64 (2022.01)
G06V 40/10 (2022.01)

(52) U.S. Cl.
CPC .......... G06V 10/7715 (2022.01); G06V 10/82 (2022.01); G06V 20/64 (2022.01); G06V 40/10 (2022.01); G06V 40/103 (2022.01); G06T 2207/20084 (2013.01); G06T 2207/30196 (2013.01)

(56) References Cited

OTHER PUBLICATIONS

International Search Report and Written Opinion for PCT/US2021/017341 dated May 3, 2021 titled "Light-Weight Pose Estimation Network With Multi-Scale Heatmap Fusion".
Zhao, Y. et al. "Cluster-wise learning network for multi-person pose estimation", Pattern Recognition, Elsevier, GB, vol. 98, Oct. 3, 2019.
Gao, B. et al. "A Lightweight Network Pose Estimation", Pattern Recognition. Image Analysis, Allen, Press, Lawrence, KS, US, vol. 29, No. 4, Oct. 1, 2019.
Zhu, X., et al. "Face alignment across large poses: A 3d solution." Proceedings of the IEEE conference on computer vision and pattern recognition. 2016.
Bulat, A., et al. "How far are we from solving the 2D & 3D Face Alignment problem? (and a dataset of 230,000 3D landmarks)", Proceedings of the IEEE International Conference on Computer Vision. 2017.
Newell, A., et al. "Associative embedding: End-to-end learning for joint detection and grouping." Advances in neural Information processing systems 30 (2017).
Pishchulin, L., et al. "Deepcut: Joint subset partition and labeling for multi person pose estimation." Proceedings of the IEEE conference on computer vision and pattern recognition. 2016.
Newell, A., et al. "Stacked hourglass networks for human pose estimation." European conference on computer vision. Springer, Cham, 2016.
Sun, Ke, et al. "Deep high-resolution representation learning for human pose estimation." Proceedings of the IEEE/CVF Conference on Computer Vision and Pattern Recognition. 2019.
Sun, Bin, et al. "LRPRNet: Lightweight Deep Network by Low-Rank Pointwise Residual Convolution." IEEE Transactions on Neural Networks and Learning Systems (2021).
He, K., et al. "Mask R-CNN", Proceedings of the IEEE international conference on computer vision. 2017.
Tan, Mi., et al. "Mixconv: Mixed depthwise convolutional kernels." arXiv preprint arXiv:1907.09595 (2019).
Howard, A.G., et al. "Mobilenets: Efficient convolutional neural networks for mobile vision applications." arXiv preprint arXiv:1704.04861 (2017).
Sandler, M., et al. "MobileNetV2: Inverted Residuals and Linear Bottlenecks", Proceedings of the IEEE conference on computer vision and pattern recognition. 2018.
Howard, A. et al. "Searching for mobilenetv3." Proceedings of the IEEE/CVF International Conference on Computer Vision. 2019.
Cao, Z., et al. "Realtime multi-person 2d pose estimation using part affinity fields." Proceedings of the IEEE conference on computer vision and pattern recognition. 2017.
Zhang, X., et al. "ShuffleNet: An extremely efficient convolutional neural network for mobile devices." Proceedings of the IEEE conference on computer vision and pattern recognition. 2018.
Ma, N., et al. "Shufflenet v2: Practical guidelines for efficient cnn architecture design." Proceedings of the European conference on computer vision (ECCV). 2018.
Xiao, B. et al. "Simple baselines for human pose estimation and tracking." Proceedings of the European conference on computer vision (ECCV). 2018.
Nie, X., et al. "Single-stage multi-person pose machines." Proceedings of the IEEE/CVF international conference on computer vision. 2019.
Papandreou, G., et al. "Towards accurate multi-person pose estimation in the wild." Proceedings of the IEEE conference on computer vision and pattern recognition. 2017.
International Preliminary Report on Patentability for International Application No. PCT/US2021/017341 dated Aug. 25, 2022.

* cited by examiner

LIGHT-WEIGHT POSE ESTIMATION NETWORK WITH MULTI-SCALE HEATMAP FUSION

RELATED APPLICATIONS

This application is the U.S. National Stage of International Application No. PCT/US2021/017341, filed Feb. 10, 2021, which designates the U.S., published in English, which claims the benefit of U.S. Provisional Application No. 62/976,099, filed on Feb. 13, 2020. The entire teachings of the above applications are incorporated herein by reference.

BACKGROUND

Location of joints in images along with pose estimation, i.e., locating body parts in images, has been a computer vision task of increasing importance.

SUMMARY

Pose estimation aims to generate an interpretable low-dimension representation of bodies in images. Pose estimation is useful for many real-world applications in sports, security, autonomous self-driving cars, and robotics, amongst other examples. Speed and accuracy are two major concerns in pose estimation applications. As a trade-off, existing methods often sacrifice accuracy in order to boost speed. In contrast, embodiments of the present invention provide a light-weight, accurate, and fast pose estimation network with a multi-scale heatmap fusion mechanism to estimate 2D poses from a single RGB image. Advantageously, embodiments can run on mobile devices in real-time while achieving comparable performance with state-of-the-art methods in terms of accuracy.

One such example embodiment is directed to a method of identifying joints of a multi-limb body in an image. Such an example embodiment, first, unifies depth of a plurality of multi-scale feature maps generated from an image of a multi-limb body to create a plurality of feature maps each having a same depth. In turn, for each of the plurality of feature maps having the same depth, an initial indication of one or more joints in the image is generated. In such an embodiment, the one or more joints are located at an interconnection of a limb to the multi-limb body or at an interconnection of a limb to another limb. To continue, a final indication of the one or more joints in the image is generated using each generated initial indication of the one or more joints.

An embodiment generates an indication of one or more limbs in the image from the generated final indication of the one or more joints in the image. Such an embodiment may also generate an indication of pose using the generated final indication of the one or more joints in the image and the generated indication of the one or more limbs in the image.

In an embodiment, the final indication of the one or more joints in the image is generated by first, upsampling at least one initial indication of the one or more joints in the image to have a scale equivalent to a scale of a given initial indication of the one or more joints with a largest scale. Second, the upsampled at least one initial indication of the one or more joints and the given initial indication of the one or more joints with the largest scale are added together to generate the final indication of the one or more joints in the image. Another embodiment unifies depth of the plurality of multi-scale feature maps by applying a respective convolutional layer to each of the plurality of multi-scale feature maps to create the plurality of feature maps each having the same depth.

Yet another embodiment applies a heatmap estimating layer to each of the plurality of feature maps having the same depth to generate each initial indication of the one or more joints in the image. According to an embodiment, the heatmap estimating layer is composed of a convolutional neural network, e.g., is a convolutional neural network layer.

An embodiment trains the aforementioned convolutional neural network. In such an embodiment, the image is a training image. Such an embodiment trains the convolutional neural network by: (1) comparing each generated initial indication of the one or more joints in the image to a respective ground-truth indication of the one or more joints in the training image to determine losses and (2) back propagating the losses to the convolutional neural network. According to an embodiment, each respective ground-truth indication of the one or more joints corresponds to a respective scale of a given feature map of the plurality of feature maps having the same depth.

Another embodiment generates the plurality of multi-scale feature maps by processing the image using a backbone neural network. According to an embodiment, processing the image using the backbone neural network includes performing multi-scale feature extraction and multi-scale feature fusion to generate the plurality of multi-scale feature maps.

Another embodiment is directed to a computer system for identifying joints of a multi-limb body in an image. In one such embodiment, the system includes a processor and a memory with computer code instructions stored thereon. The processor and the memory, with the computer code instructions, are configured to cause the system to implement any embodiments or combination of embodiments described herein.

Yet another embodiment is directed to a computer program product for identifying joints in an image. The computer program product comprises one or more non-transitory computer-readable storage devices and program instructions stored on at least one of the one or more storage devices. When the program instructions are loaded and executed by a processor, the program instructions cause an apparatus associated with the processor to implement any embodiments or combination of embodiments described herein.

It is noted that embodiments of the method, system, and computer program product may be configured to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications, and references cited herein are incorporated by reference in their entirety.

Two-dimensional (2D) pose estimation, which was studied before the deep learning era, is a well-studied, yet challenging problem. Given an input image, the objective of 2D pose estimation is to estimate the 2D location of body joints, e.g., human body parts.

In real-world applications, pose estimation acts as a basis for other tasks such as autonomous driving, security, human action recognition, and human-computer interaction, amongst other examples. Traditionally, pose estimation is done via a graphical pose model. Recently, developments in deep convolutional neural networks (CNNs) have significantly boosted the performance of pose estimation. To improve the performance of pose estimation, existing methods tend to use a deep and high-capacity CNN architecture pretrained on a large-scale dataset and adapted to the pose estimation task [1, 2, 3] (bracketed numbers in this document refer to the enumerated list of references hereinbelow). However, the scaling problem still remains as a bottleneck. The scaling problem results from people in images being different sizes (scales) and their joints/limbs also being different sizes. This occurs, for example, when only a person's upper body is in an image. Traditional network architectures tend to capture/detect joints at fixed sizes. Changes in scale greatly reduces the accuracy of these traditional architectures. In an attempt to solve the scaling problem, existing methods use large capacity networks as the backbone for learning feature representations. The backbone networks are usually designed for image classification [4, 5].

However, it is difficult to utilize these backbone architectures for direct applications on mobile and embedded devices because of the model complexity of these backbone architectures [4, 5] in terms of time and space. Therefore, there is a need to design dedicated deep convolutional neural network (DCNN) modules to reduce the computational cost and storage size for further applications on end devices, e.g., mobile phones. Although some light-weight structures have emerged recently, their accuracy on pose estimation is unsatisfactory since these light-weight structures are designed for image classification. Thus, a fast and accurate network for pose estimation is needed.

Figure 1:
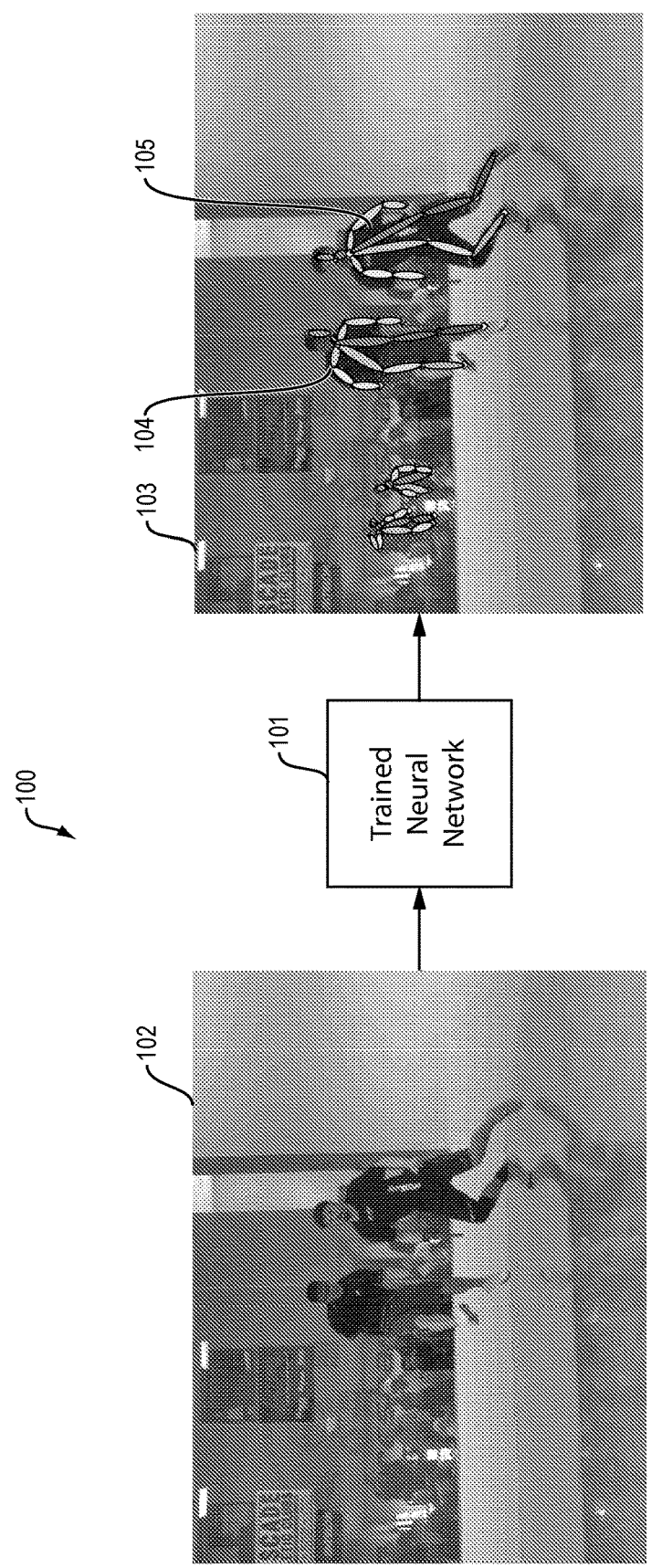
FIG. 1 is a simplified diagram of a system to identify joints according to an embodiment.

FIG. 1 is simplified diagram of a system 100 that provides such functionality. Specifically, the system 100 identifies joints and limbs in an image. The system 100 includes the trained neural network 101. The neural network 101 is trained to identify joints and limbs in an image as described herein. The neural network 101 may implement the system 440 described hereinbelow in relation to FIGS. 4A-B and the neural network 101 may be configured to carry out the method 330 described hereinbelow in relation to FIG. 3.

In operation, the trained neural network 101 receives the image 102 and processes the image 102 to generate the indication 103 of body parts, e.g., the joint 104 and the limb 105, in the image 102.

Figure 2C:
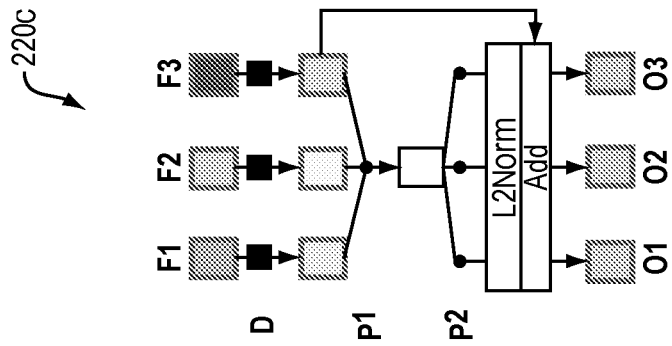
FIGS. 2A-C are block diagrams of convolutional architectures that may be utilized in embodiments.
Figure 2B:
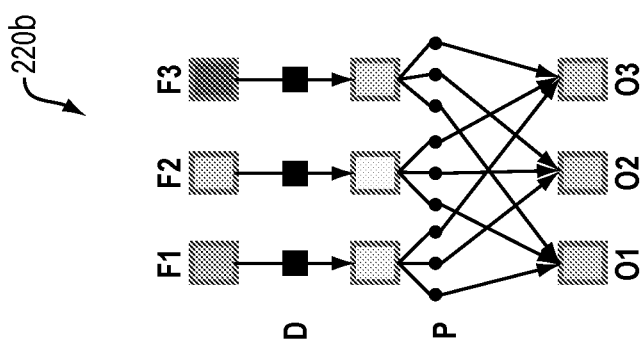
Figure 2A:
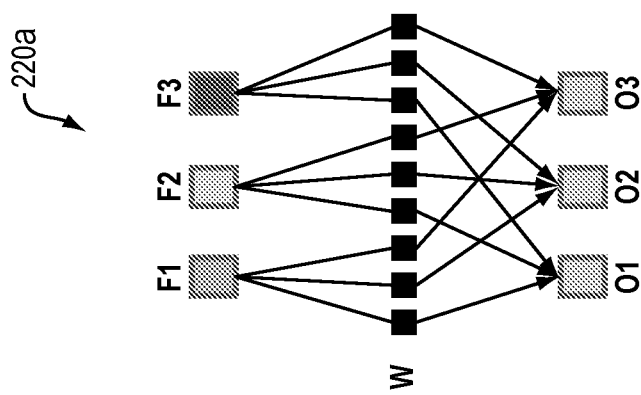

Embodiments, e.g., the system 100, implement a light-weight pose estimation network with a multi-scale heatmap fusion mechanism. In an embodiment, the proposed network has two parts: a backbone architecture and a head structure. To achieve low model complexity, an embodiment utilizes a plug-and-play structure referred to herein as Low-rank Pointwise Residual module (LPR). The structure 220c of the LPR module is shown in FIG. 2C. In contrast, FIG. 2A illustrates a standard convolution network 220a and FIG. 2B illustrates a depthwise separable convolution (DSC) module 220b [6]. While embodiments can utilize the structures 220a-c, particularly advantageous efficiencies are achieved by embodiments utilizing the LPR module structure 220c of FIG. 2C.

On one hand, the computation cost and parameters are reduced significantly when the number of point-wise layers, e.g., the 1 by 1 convolution layer P1 in FIG. 2C, is much less than the input channels. On the other hand, to compensate for the low-rankness of pointwise convolution and performance recession due to this compression, a residual operation through depthwise convolution is implemented to complement the feature maps without any additional parameters.

To achieve better performance for pose estimation, an embodiment implements the LPR module (the structure 220c) on the architecture of HRNet [3], which is specifically designed for pose estimation and achieves state-of-the-art performance by maintaining high-resolution representations through the whole process of pose estimation. To further improve the performance, an embodiment implements a novel multi-scale heatmap estimation and fusion mechanism, which localizes joints from extracted feature maps at multiple scales and combines the multi-scale results together to make a final joint location estimation. The multi-scale estimation and fusion technique attempts to localize body joints on different scales using a single estimating layer. In embodiments, the estimation is done on multi-scale feature maps. A single estimating layer is utilized which ensures that such an embodiment is looking for the same-scale joints on multiple scales. This process is looking for multi-scale joints on the same image. This allows embodiments to handle different scales. Such a design of the head network further boosts the accuracy of pose estimation performance.

By implementing a light-weight structure that uses a low-rank approach and implementing the structure on the architecture of HRNet [3] as a backbone, embodiments reduce computational costs by more than 70% (in FLOPs) and reduce parameters by over 85% with only a 2% loss in accuracy. This is shown in Table 2 below where a standard convolution layer, e.g., SConv, has 589,824 parameters which requires 2.36 MB of memory to store and the LPR block used in embodiments has only 18,688 parameters and only requires 0.07 MB of memory to store. In embodiments, parameters are weights stored in a convolution layer and, thus, the number of parameters refers to the number of weights. Typically, one parameter, i.e., weight, requires 4 bytes to store. Thus, it is advantageous to reduce the number of parameters as described herein. Further, embodiments, provide a novel head structure for pose estimation. Embodiments extract multi-scale feature maps from the input image and estimate multi-scale joint heatmaps from those multi-scale feature maps. Then, those multi-scale estimations (feature maps) are fused together to determine a final estimation. This approach solves the scaling problem of pose estimation.

Deep Light-Weight Structure

In recent years, methods have emerged for speeding up the deep learning model. A faster activation function referred to as rectified-linear activation function (ReLU) was proposed to accelerate the model [7]. Jin et al. [8] showed the flattened CNN structure to accelerate the feedforward procedure. In [9] depthwise separable convolution was initially introduced and was used in Inception models [10], Xception network [11], MobileNet [6, 12], and ShuffleNet [13, 14], and condensenet [15].

Besides designing architectures manually, implementing networks to search CNN architectures was another significant method. Many networks are searched by algorithms automatically, such as Darts [16], NasNet [17], PNasNet [18], ProxylessNas [19], FBNet [20], MNasNet [21], MobileNetv3 [22], and MixNet [23]. These implementations pushed the state-of-the-art performance while requiring fewer FLOPs and parameters.

Low-rank methods are another way to make light-weight models. Group Lasso [24] is an efficient method for regularization of learning sparse structures. Jaderberg et al. [25] implemented the low-rank theory on the weights of filters with separate convolution in different dimensions. An architecture referred to as SVDNet [26] also considers matrix low-rankness in its framework to optimize the deep representation learning process. IGC [27, 28, 29] utilizes grouped pointwise convolution to factorize the weight matrices as block matrices. In contrast from IGC, embodiments of the present invention implement the LPRNet module 220c of FIG. 2C which employs a low dimension pointwise layer to compress the model. Moreover, embodiments can recover the information loss with residuals from the depthwise layer and L2 layer normalization.

Pose Estimation

Pose Estimation aims to estimate poses of people, e.g., multiple person poses, in an image. Pose estimation has been studied in computer vision [30, 31, 32, 33, 34] for a long time. Before deep learning was introduced, pose estimation methods utilized pictorial structures [30] or graphical models [34]. Recently, with the development and application of deep learning models, i.e., neural networks, attempts have been made to utilize deep convolutional neural networks to do 2D multi-person pose estimation. These attempts can be categorized into two major categories: (1) top-down methods and (2) bottom-up methods.

Top-down approaches have two stages. The first stage detects people in the image using a person detector. The second stage uses a single person pose estimator to determine poses for the people detected in the first stage. He et al. [35] extended the Mask-RCNN framework to human pose estimation by predicting a one-hot mask for each body part. Papandreou et al. [36] utilized a Faster RCNN detector to predict person boxes and applied ResNet in a fully convolutional fashion to predict heatmaps for every body part. Fang et al. [37] designed a symmetric spatial transformer network to alleviate the inaccurate bounding box problem.

Bottom-up approaches also have two stages. Bottom up approaches first detect body parts and, second, associate body parts into people. Pishchulin et al. [38] proposed using an Inter Linear Program method to solve the body part association problem, i.e., associating joints estimated from an image into different persons. Cao et al. [2] introduced Part Affinity Fields to predict the direction and activations for each limb to help associate body parts. Newell et al. [39] utilized predicted pixel-wise embeddings to assign detected body parts into different groups.

More recently, there have been efforts to develop a single-stage approach for multi-person pose estimation [40]. The speed of single-stage methods surpasses the two-stage methods, but the accuracy of single-stage methods is still much lower than the state-of-the-art top-down methods.

Embodiments follow a top-down approach and utilize a person detector to first detect a person bounding box and, second, estimate the location of body joints within the bounding box. Embodiments shrink down the capacity of pose estimation networks using a novel light-weight neural network block and utilize a multi-scale heatmap extraction and fusion mechanism to solve the scaling problem and improve the performance.

Figure 3:
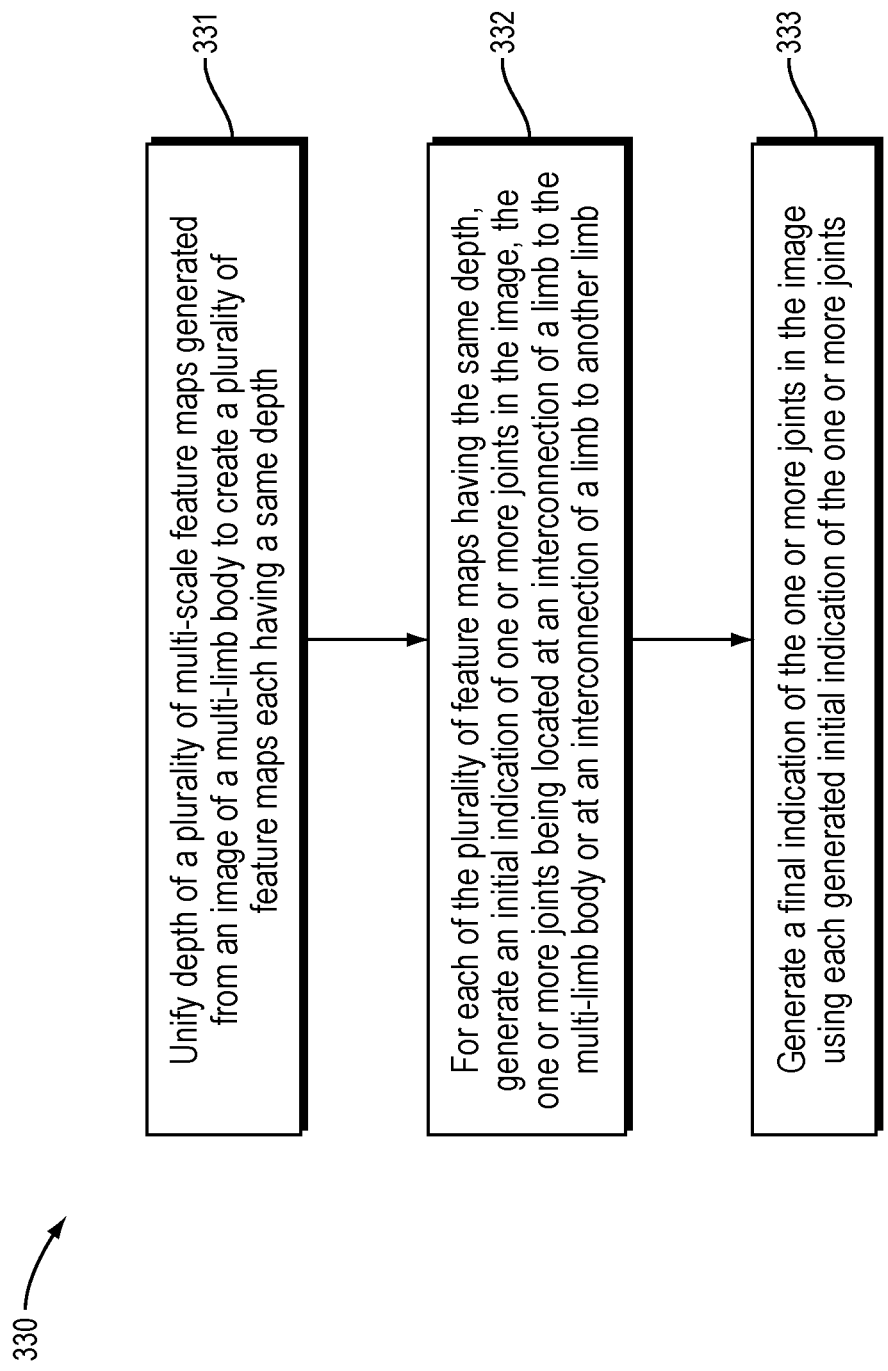
FIG. 3 is a flow diagram of a method for identifying joints of a multi-limb body in an image according to an embodiment.

FIG. 3 is a flow diagram of a method 330 for identifying joints of a multi-limb body in an image according to an embodiment. The method 330, unifies 331 depths of a plurality of multi-scale feature maps generated from an image of a multi-limb body to create a plurality of feature maps each having a same depth. A typical feature map has four dimensions [N,C,H,W] where, N is mini-batch size, C is channels/depth, H is height, and W is width. Embodiments unify 331 the feature maps so they have the same number of channels/same depth. In turn, for each of the plurality of feature maps having the same depth (the depth-unified feature maps), the method 330 generates 332 an initial indication of one or more joints in the image. In other words, at 332, for each respective depth-unified feature map, a respective initial indication of joints in the image is generated. According to an embodiment, the one or more joints are located at an interconnection of a limb to the multi-limb body or at an interconnection of a limb to another limb. To continue, a final indication of the one or more joints in the image is generated 333 using each generated initial indication of the one or more joints. In an embodiment of the method 330, the unifying 331, generation 332 of the initial indications of one or more joints, and generation 333 of the final indication of the one or more joints may be implemented as described hereinbelow in relation to FIG. 4B.

Embodiments of the method 330 may be used to identify joints of any type of object. For example, in an embodiment, the indication of the one or more joints in the image corresponds to joints of at least one of: a human, animal, machine, and robot, amongst other examples. Moreover, embodiments may identify joints for multiple objects, e.g., people, in an image.

According to an embodiment, the initial indications of one or more joints and final indication of one or more joints, are indications of locations of joints in the image. In an embodiment, the indications of one or more joints indicates a probability of a joint at each location in the image. According to an embodiment, locations are x-y coordinates in the image. Further, in an embodiment, the unit of the locations, e.g., coordinates, are in pixels.

An example embodiment of the method 330 generates the plurality of multi-scale feature maps (that are unified 331) by processing the image using a backbone neural network. According to an embodiment, processing the image using the backbone neural network comprises performing multi-scale feature extraction and multi-scale feature fusion to generate the plurality of multi-scale feature maps. According to an embodiment of the method 330, the plurality of multi-scale feature maps are generated using the functionality described hereinbelow in relation to FIG. 4A and, specifically, the backbone network 442 of the system 440.

An embodiment of the method 330, unifies 331 depths of the plurality of multi-scale feature maps by applying a respective convolutional layer to each of the plurality of multi-scale feature maps to create the plurality of feature maps each having the same depth. In other words, in such an embodiment, a different convolutional layer is applied to each different feature map, and these different convolutional layers are configured to output feature maps that have the same depth. It can be said that such functionality unifies channels of the feature maps. In an embodiment, the feature maps are unified using the functionality described hereinbelow in relation to FIG. 4B.

Yet another embodiment generates 332 the initial indication of the one or more joints in the image for each of the plurality of feature maps having the same depth by applying a heatmap estimating layer to each of the plurality of feature maps having the same depth. In such an embodiment, a respective indication of joints in the image is generated 332 for each respective feature map. In an embodiment, the heatmap estimating layer is composed of a convolutional neural network.

Another embodiment of the method 330 trains the heatmap estimating layer composed of the convolutional neural network that is used to generate 332 the initial indications of the one or more joints in the image. In such an embodiment, the image is a training image. Such an embodiment trains the convolutional neural network by comparing each generated initial indication of the one or more joints in the image to a respective ground-truth indication of the one or more joints in the training image to determine losses. These determined losses are back propagated to the convolutional neural network to adjust weights of the neural network. According to an embodiment, each respective ground-truth indication of the one or more joints corresponds to a respective scale of a given feature map of the plurality of feature maps having the same depth. Further training functionality that may be employed in embodiments is described hereinbelow in relation to FIG. 5.

According to an embodiment of the method 330, the final indication of the one or more joints in the image is generated 333 by first, upsampling at least one initial indication of the one or more joints in the image to have a scale equivalent to a scale of a given initial indication of the one or more joints with a largest scale. Such functionality may include performing upsampling on a plurality of initial indications of the one or more joints so that all of the initial indications have an equal scale, i.e., size. In an embodiment, the sizes (H×W) of the initial estimations of joint locations generated using the multi-scale feature maps are the same sizes as the feature maps. To illustrate, consider an embodiment with three multi-scale feature maps (64×64, 128×128, 256×256). In such an embodiment, the initial joints/body estimation on those feature maps will have the same sizes (64×64, 128×128, 256×256). By upsampling the initial estimations to the same size (256×256), the estimations can be added together, or processed with a max(operator, to generate the final indication of joints (256×256). In an embodiment, the initial estimations are matrices/tensors filled with float values. After the upsampling, the initial estimations have the same size (number of joints×height×width). These matrices can be added together elementwise. Likewise, the max(operator can be implemented elementwise. In such implementations, the result of adding the matrices together elementwise or applying the max(operator elementwise is the final indication of joints in the image.

In an embodiment, the upsampling processes the initial indications of the one or more joints so that the indications have the same scale as the initial indication with the largest scale. As such, in an embodiment, one initial indication is not upsampled, the initial indication with the largest scale. To continue, the upsampled at least one initial indication of the one or more joints and the given initial indication of the one or more joints with the largest scale are added together to generate 333 the final indication of the one or more joints in the image. In an embodiment, the final indication of the one or more joints is generated 333 by adding together all of the initial indications of joints (which were previously upsampled). An embodiment generates 333 the final indication of the one or more joints in the image as described hereinbelow in relation to FIG. 4B.

Another embodiment of the method 330 generates an indication of one or more limbs in the image from the generated 333 final indication of the one or more joints in the image. Such an embodiment may also generate an indication of pose using the generated final indication of the one or more joints in the image and the generated indication of the one or more limbs in the image.

Hereinbelow, a problem formulation for joint identification is provided. In addition, a light-weight convolutional neural network module and a framework architecture for light-weight multi-scale feature map extraction that may be utilized in embodiments are described. Details for estimating and fusing multi-scale heatmaps according to embodiments for identifying joints in images is also further elaborated upon.

Problem Definition

Let F be an image containing multiple persons and I be a cropped image (H×W×3) of one single person using a corresponding bounding box estimated from a pretrained person detector. Let $p(n_p \times 2)$ denotes the 2D x-y coordinates of the body joints keypoints of that person. Then, the objective can be described as finding the estimated heatmap of human body joints h from the input cropped image I, denoted as h=G(I). The mapping function G is obtained by training the proposed deep convolutional neural networks. The estimated 2D keypoints p can be obtained by finding the location of strongest responding signal from the heatmap.

As described in further detail below, an implementation utilizes a deep neural network architecture (referred to herein as backbone) which extracts features to capture the related information contained in the images. Then, a shallow convolutional neural network (referred to herein as head) is used to estimate the heatmap of joints, e.g., human joints.

Light-Weight CNN Block

Hereinbelow, a low-rank pointwise residual network (LPRNet) that may be used in embodiments is described. First, the matrix explanations of standard convolution [4] and depthwise separable convolution [6] are described. Next, a novel LPR structure and functionality for using the novel LPR structure to build the LPRNet is presented. Finally, discussions and preliminary experiments of the LPRNet are shown. Denotations used herein are summarized in in Table 1.

TABLE 1

Denotations

| symbols | denotations |
| --- | --- |
| $S_F$ | the size of one feature map |
| $C_{in}$ | the number of input channels |
| $D_{ij}$ | the ith weight for the jth feature in Depthwise layer |
| $W_{ij}$ | the ith weight for the jth feature in Standard Conv. |
| $F_j$ | the jth feature map of the input |

TABLE 1-continued

Denotations

| symbols | denotations |
|---|---|
| $S_k$ | the size of one kernel |
| $C_{out}$ | the number of output channels |
| $P_{ij}$ | the ith weight for the jth feature in Ponitwise layer |
| $\otimes$ | each element does Kronecker Product |
| k | the parameter to control the matrix rank |

Table 2 below compares the computational cost in FLOPS and parameters of existing networks and the LPRNet that may be used in embodiments. SConv, DSC, Shufflev2, and LPR modules are used to build VGG [4], Mobilenetv1 [6], ShuffleNetv2 [14], and the LPRNet respectively.

TABLE 2

Comparisons of Computational Costs (Flops) and Parameters

| Modules | computational cost (FLOPs) | Parameters |
|---|---|---|
| SConv [4] | $S_k^2 \times S_F^2 \times C_{in} \times C_{out}$ | $S_k^2 \times C_{in} \times C_{out}$ |
| DSC [6] | $\left(\frac{1}{C_{out}} + \frac{1}{S_1^2}\right) \times S_k^2 \times S_F^2 \times C_{in} \times C_{out}$ | $\left(\frac{1}{C_{out}} + \frac{1}{S_1^2}\right) \times S_k^2 \times C_{in} \times C_{out}$ |
| Shufflev2 [14] | $\frac{1}{2}\left(\frac{1}{C_{out}} + \frac{1}{S_k^2}\right) \times S_k^2 \times S_F^2 \times C_{in} \times C_{out}$ | $\frac{1}{2}\left(\frac{1}{C_{out}} + \frac{1}{S_k^2}\right) \times S_k^2 \times C_{in} \times C_{out}$ |
| LPR | $\left(\frac{1}{C_{out}} + \frac{2}{kS_1^2}\right) \times S_k^2 \times S_F^2 \times C_{in} \times C_{out}$ | $\left(\frac{1}{C_{out}} + \frac{2}{kS_1^2}\right) \times S_k^2 \times C_{in} \times C_{out}$ |
| SConv [4] | 115,605,504 | 589,824 |
| DSC [6] | 13,296,640 | 67,840 |
| Shufflev2 [14] | 6,648,320 | 33,920 |
| LPR | 3,662,848 | 18,088 |

$S_F = 14$, $S_k = 3$, $C_{in} = 256$, $C_{out} = 256$, $k = 8$

Standard Convolutions (SConv)

In traditional DCNNs, the convolution operation is applied between each filter and the input feature map. Essentially, the filter applies different weights to different features while doing convolution. Afterwards, all features convoluted by one filter are added together to generate a new feature map. The whole procedure is equivalent to certain matrix products, which can be formally written as:

$$\begin{bmatrix} W_{11} & \cdots & W_{1m} \\ \vdots & \ddots & \vdots \\ W_{n1} & \cdots & W_{nm} \end{bmatrix} \otimes [F_1 F_2 \ldots F_m]^T. \quad (1)$$

where $W_{ij}$ is the weight of the filter i corresponding to the feature map j, $F_j$ is the input feature map, and $W_{ij} \otimes F_j$ means the feature map $F_j$ is convoluted by a filter with the weight $W_{ij}$. Herein, each $W_{ij}$ is a 3×3 matrix (filter), and constitutes a large matrix $[W_{ij}]$, or simply W.

Depthwise Separable Convolutions (DSC)

Depthwise Separable Convolution layers are key components for many light-weight neural networks [13, 6, 12]. A DSC structure has two layers, a depthwise convolutional layer and a pointwise convolutional layer [6].

The depthwise convolutional layer applies a single convolutional filter to each input channel which massively reduces the parameter and computational cost. Following the process of its convolution, the depthwise convolution can be described using the matrix:

$$\begin{bmatrix} D_{11} & \cdots & 0 \\ \vdots & \ddots & \vdots \\ 0 & \cdots & D_{mm} \end{bmatrix} \otimes [F_1 F_2 \ldots F_m]^T \quad (2)$$

In Equation 2 $D_{ij}$ is usually a 3×3 matrix, m is the number of input feature maps. An embodiment defines D as the matrix $[D_{ij}]$. Because D is a diagonal matrix, the depthwise layer has significantly fewer parameters than a standard convolution layer.

The pointwise convolutional layer uses 1×1 convolution to build the new features through computing the linear combinations of all input channels. The pointwise convolutional layer is a kind of traditional convolution layer with the kernel size set as 1. Following the process of its convolution, the pointwise convolution can be described using the matrix:

$$\begin{bmatrix} p_{11} & \cdots & p_{1m} \\ \vdots & \ddots & \vdots \\ p_{n1} & \cdots & p_{nm} \end{bmatrix} \otimes [F_1 F_2 \ldots F_m]^T \quad (3)$$

In equation 3 $p_{ij}$ is a scalar, m is the number of input feature maps, and n is the number of outputs. The computational cost is $S_F \times S_F \times C_{in} \times C_{out}$, and the number of parameters is $C_{in} \times C_{out}$. An embodiment defines $P \in \mathbb{R}^{m \times n}$ as the matrix $[p_{ij}]$. Since the depthwise separable convolution is composed of the depthwise convolution and pointwise convolution, the depthwise separable convolution can be represented as:

$$F_m^{out} = W \otimes F_m^{in} \approx (P \times D) \otimes F_m^{in} \quad (4)$$

LPR Structure

This subsection details the proposed LPR module 220c of FIG. 2. As noted in the previous section, the depthwise convolution can be considered as the convolution between a diagonal matrix $dig(D_{11}, \ldots D_{mm})$ and a feature map matrix $[F_1 \ldots F_m]$. The LPR structure keeps this procedure, but further explores the pointwise convolution in the following manner. To further reduce the size of matrix P, an embodiment implements a low-rank decomposition of P such that $P \approx P^{(2)} \times P^{(1)}$, $P^{(1)} \in \mathbb{R}^{m \times n}$, $P^{(2)} \in \mathbb{R}^{m \times n}$, r<<m. Clearly, the highest rank of this approximation is r, and the size of m×r is much smaller than m². Thus, an embodiment can convert the original DSC module to:

$$F_m^P = \left(P_{mr}^{(2)} P_{rm}^{(1)}\right) \otimes F_m^D = \left(\begin{bmatrix} p_{11}^{(2)} & \cdots & p_{1r}^{(2)} \\ \vdots & \ddots & \vdots \\ p_{m1}^{(2)} & \cdots & p_{mr}^{(2)} \end{bmatrix} \begin{bmatrix} p_{11}^{(1)} & \cdots & p_{1m}^{(1)} \\ \vdots & \ddots & \vdots \\ p_{r1}^{(1)} & \cdots & p_{rm}^{(1)} \end{bmatrix} \begin{bmatrix} D_{11} & \cdots & 0 \\ \vdots & \ddots & \vdots \\ 0 & \cdots & D_{mm} \end{bmatrix}\right) \otimes [F_1 \ldots F_m]^T \quad (5)$$

where $F^P$ means the output features after this new low-rank pointwise convolution operation.

While using the strategy above, an embodiment may reduce the parameters and computational cost, however, such an embodiment may undermine the original structure of P when r is inappropriately small, e.g., r<rank(P). To address this issue, an embodiment adds a term $F_m^{Res} = D \otimes F_m^{in}$, i.e., the original feature map after the depthwise convolution with D. This ensures that if the overall structure of P is compromised, the depthwise convolution is still able to capture the spatial features of the input. Note, this is similar to the popular residual learning where $F_m$ is added to the module output, but embodiments use $D \otimes F_m^{in}$ instead. By considering this residual term, such an embodiment can formulate a low-rank pointwise residual module as:

$$F_m^{out} = F_m^P + F_m^{Res} = (P_{mr}^{(2)} P_{rm}^{(1)} + I_m) D_m \otimes F_m^{in}, \quad (6)$$

where $I_m$ is an identity matrix. To further improve the performance, an embodiment may normalize the features of $F_m^{(P)}$ with L2 normalization on the channel, and apply batch normalization on D.

With the factorization of the large matrix P, the LPR described herein successfully reduces the parameters and computational costs compared with other state-of-the-art modules. To verify these performance improvements, a set of experiments on ImageNet with MobileNet architecture has been performed to select the best rank control parameter k during the low-rank decomposition. The results of these experiments are shown in Table 3.

TABLE 3

Experiments to select the best rank parameter k

| Rank parameter k of LPR | ImageNet Top-1 | FLOPs | Parameters |
|---|---|---|---|
| k = 4 | 70.8% | 363M | 3.0M |
| k = 8 | 70.6% | 260M | 2.3M |
| k = 16 | 68.1% | 209M | 2.0M |
| MobileNet | 70.6% | 574M | 4.2M |

The results in Table 3 show that if k is 8, good performance is achieved while also providing a significant reduction to the computational costs and parameters. With k=8 as the rank control parameter, the theoretical comparisons among the prevalent light-weight modules are shown in Table 2. The results in Table 2 show that the LPR module has the lowest computational costs and parameters when the input and output are the same. Note that $kS_k^2 < (k-4)C_{out}$ is the sufficient and necessary condition which can result in the LPR module having lower computational costs and parameters than a ShuffleNetv2 module. Thus, k should be larger than 4. Note that $P_{mr}^{(2)}$ and $P_{rm}^{(1)}$ are learned to approximate the optimized matrices through training.

Multi-Scale Feature Extraction and Fusion

Figure 4A:
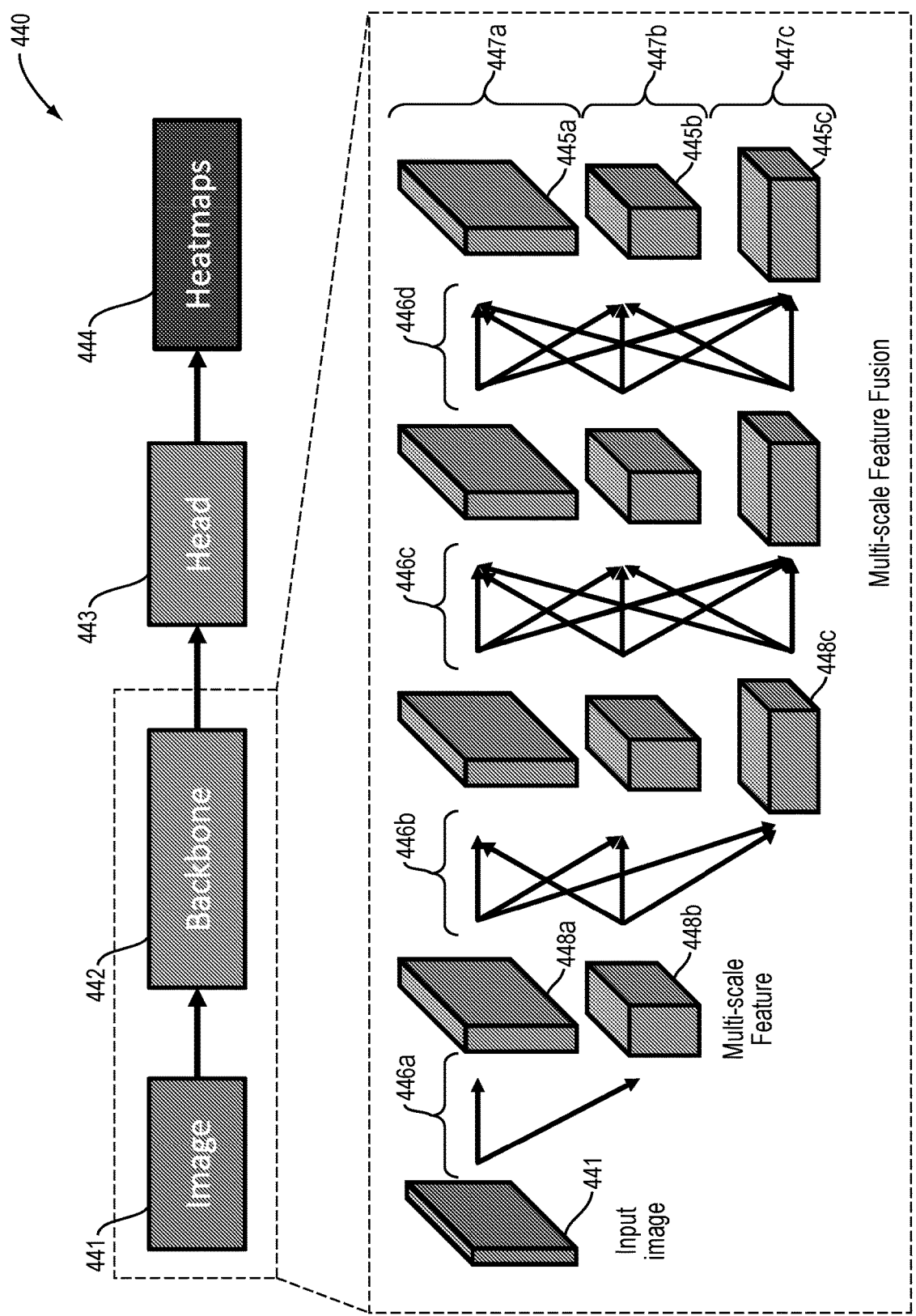
FIGS. 4A-B are block diagrams of a system embodiment for identifying joints in an image.
Figure 4B:
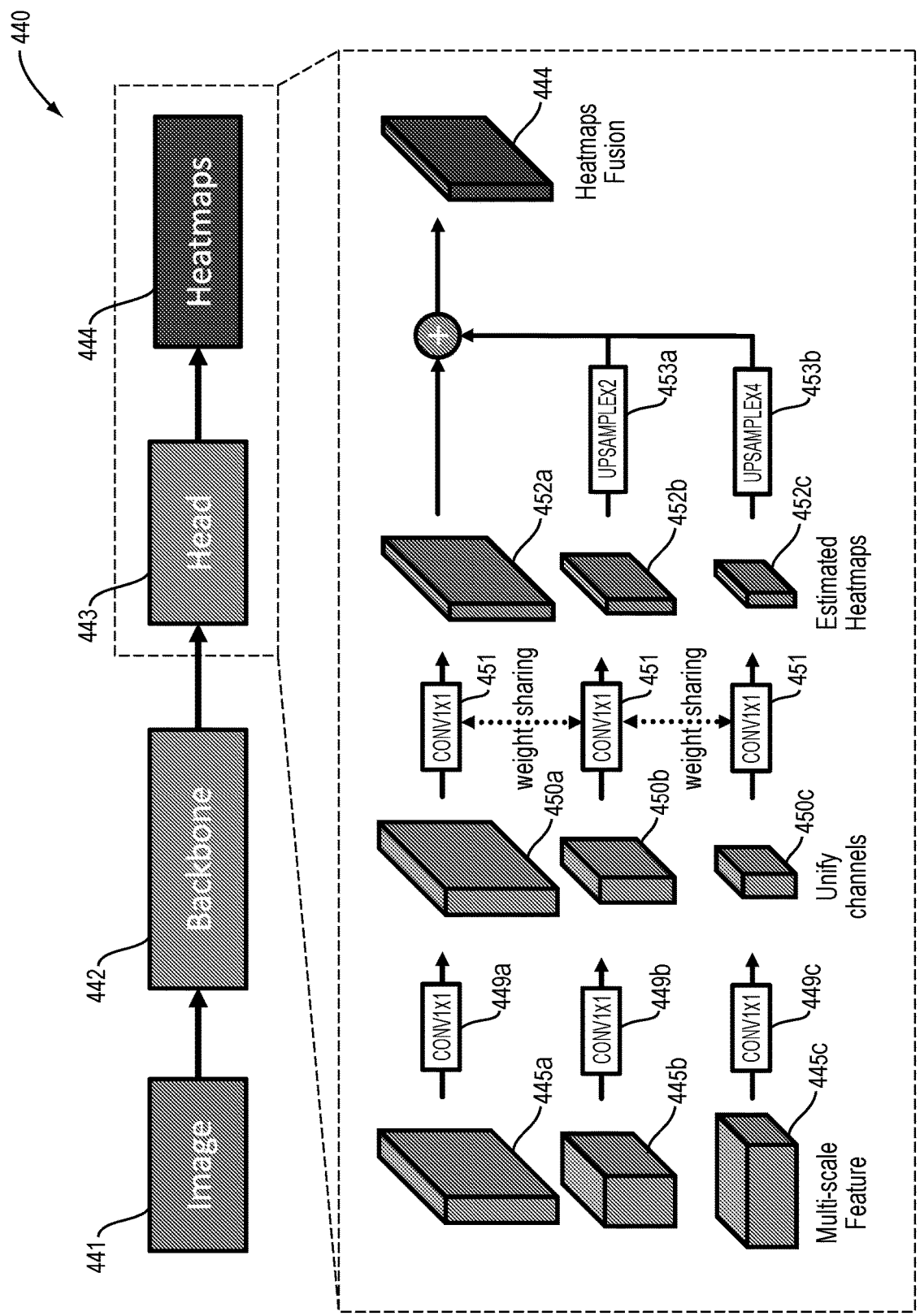

An embodiment implements a multi-scale feature extraction and fusion approach to extract high-resolution features from an input image as detailed in FIG. 4A. This high-resolution feature extraction approach is suitable for the fine-grain task of body joint localization. FIGS. 4A and 4B illustrate a system 440 that processes an image 441 with a backbone network 442 and head network 443 to generate a heatmap 444 that indicates the location of joints in the image 441. FIG. 4A illustrates details of processing the image 441 using the backbone network 442 to create the multi-scale features 445a-c. FIG. 4B illustrates details of processing the multi-scale features 445a-c using the head network 443 to generate the heatmap 444.

In the system 440 the backbone 442 is constructed in a parallel architecture. The backbone 442 is a multi-stage, multi-scale feature extracting network with multi-scale feature exchanging. The backbone network 442 extracts features in high-resolution, medium-resolution, and low-resolution scales. At the first stage 446a, in the high-resolution path 447a, the backbone 442 extracts features from the input image 441 in the original resolution without downsampling to create the feature map 448a. Meanwhile, in the first stage 446a of the mid-resolution path 447b, the backbone 442 downsamples from the original resolution of the image 441 while extracting features once to create the feature map 448b. At the second stage 446b, in the low-resolution path 447c, the backbone extracts features and downsamples from the mid-resolution path 447b once to create the feature map 448c. In this way, the backbone 442 implements multi-scale feature extraction, i.e., determines feature maps and multiple different resolutions.

Meanwhile, there are exchanging modules (illustrated by merging arrows in FIG. 4A) between each stage 446b-d, which fuses multi-scale features together to be the input features of the next stage. This fusing allows features from the different resolution paths 447a-c to exchange their information and better learn representation. In this way, the backbone 442 implements multi-scale feature fusion, i.e., combines feature maps from multiple different resolutions. Mathematically the exchanging process can be expressed as follows:

$$f_h^i = G_h^i(f_h^{(i-1)}) + U(G_m^i(f_m^{(i-1)}),2) + U(G_l^i(f_l^{(i-1)}),4) \quad (7)$$

$$f_m^i = U(G_h^i(f_h^{(i-1)}),0.5) + G_m^i(f_m^{(i-1)}) + U(G_l^i(f_l^{(i-1)}), 0.25) \quad (8)$$

$$f_l^i = U(G_h^i(f_h^{(i-1)}),0.25) + U(G_m^i(f_m^{(i-1)}),0.5) + G_l^i(f_l^{(i-1)}) \quad (9)$$

where $f_{h,m,l}^i$ are the feature maps in high, medium, and low resolutions at the end of stage i. U(f,s) is a unifying function which unifies the channel size as well as upsamples or downsamples the feature map function with scale s. In an embodiment, at each stage 446a-d, every feature extraction is done by the LPR module 220c described hereinabove in relation to FIG. 2C. Utilizing the LPR module 220c reduces more than 70% FLOPs and over 85% parameters compared with traditional convolutional neural networks.

The backbone network 442 processes feature maps across the stages 446a-d by implementing multi-scale feature extraction (i.e., creating feature maps at multiple different resolutions) and by implementing multi-scale feature fusion where features maps are upsampled (e.g., so a feature map from the low resolution path 447c is combined with a feature map from the medium resolution path 447b or high resolution path 447a) or downsampled (e.g., so a feature map from the high resolution path 447a is combined with a feature map from the medium resolution path 447b or low resolution path 447c) to create the multi-scale features 445a-c. It is noted that while three resolution paths 447a-c are implemented by the backbone network 442 illustrated in FIG. 4A, embodiments are not so limited and more or less resolution paths may be utilized.

Multi-Scale Heatmap Estimation, Fusion, and Supervision

As described above, in the system 440 the backbone network 442 is designed to extract the multi-scale features 445a-c from the input image 441. In the system 440, the backbone network 442 is concatenated with the head network 443 to output the estimated heatmap 444. The overall design of the head network 443 is depicted in FIG. 4B.

In the head network 443, first, the multi-scale feature maps 445a-c are obtained from the backbone network 442. A respective convolutional layer 449a-c with kernel size of 1 is applied on each feature map 445a-c to change each feature map's channel size, i.e., depth, to a fixed size. This results in the multi-scale feature maps 450a-c which all have the same channel size, i.e., unified depth. Then, a heatmap estimating layer 451 with fixed kernel size is applied on the feature maps 450a-c to generate initial estimated heatmaps 452a-c at multiple scales. It is noted that in the head network 443 there is a single heatmap layer 451, but the heatmap layer 451 is depicted multiple times to more clearly illustrate the functionality of the head network 443. In an embodiment, processing of the multi-scale feature maps 450a-c by the heatmap layer 451 utilizes weight sharing. Here, weight sharing means that the CONV1×1s 451 depicted in FIG. 4B are the same module that have the same parameters/weights. To continue, the head network 443 fuses the initial heatmaps 452a-c by, first, upsampling the smaller-size heatmaps (452b-c) to the size of the largest heatmap 452a. In such an embodiment, the heatmap 452b is upsampled using the upsampler 453a and the heatmap 452c is upsampled using the upsampler 453b. To illustrate an embodiment, an upsampler, e.g., 453a, may upsample a 64×64 heatmap to be 128×128. Upsampling features is similar to upsampling images, in that it increases the height and width of the estimated heatmaps. The upsamplers 453a and 453b can perform the upsampling using mathematical methods such as bicubic or bilinear methods. Second, all the heatmaps (452a and upsampled 452b-c) are summed together to create a fused heatmap 444 as a final estimation of joint locations in the image 441. The heatmaps (452a and upsampled 452b-c) can also be processed using a max( ) operation to determine the fused heatmap 444. The objective function can be described as $$\mathcal{L} = \|G(I) - \bar{h}\|_2 \quad (10)$$

where I is the input cropped image, $\bar{h}$ is the corresponding ground-truth heatmap generated from the ground-truth keypoints. The objective function aims to help the whole network to learn to extract features from the input image 441 and estimate the possible location of human body joints. This objective can be further extended to multi-scale supervision, which supervises heatmaps at multiple scales by $$\mathcal{L} = \sum_{i=l,m,h} \|G_i(I) - \bar{h}_i\|_2 \quad (11)$$

where the subscript i=l,m,h indicates the low-resolution, mid-resolution, and high-resolution feature extraction and ground-truth heatmaps. Multi-scale heatmap supervision can further improve the accuracy of the pose estimation, i.e., the heatmap 444.

Figure 5:
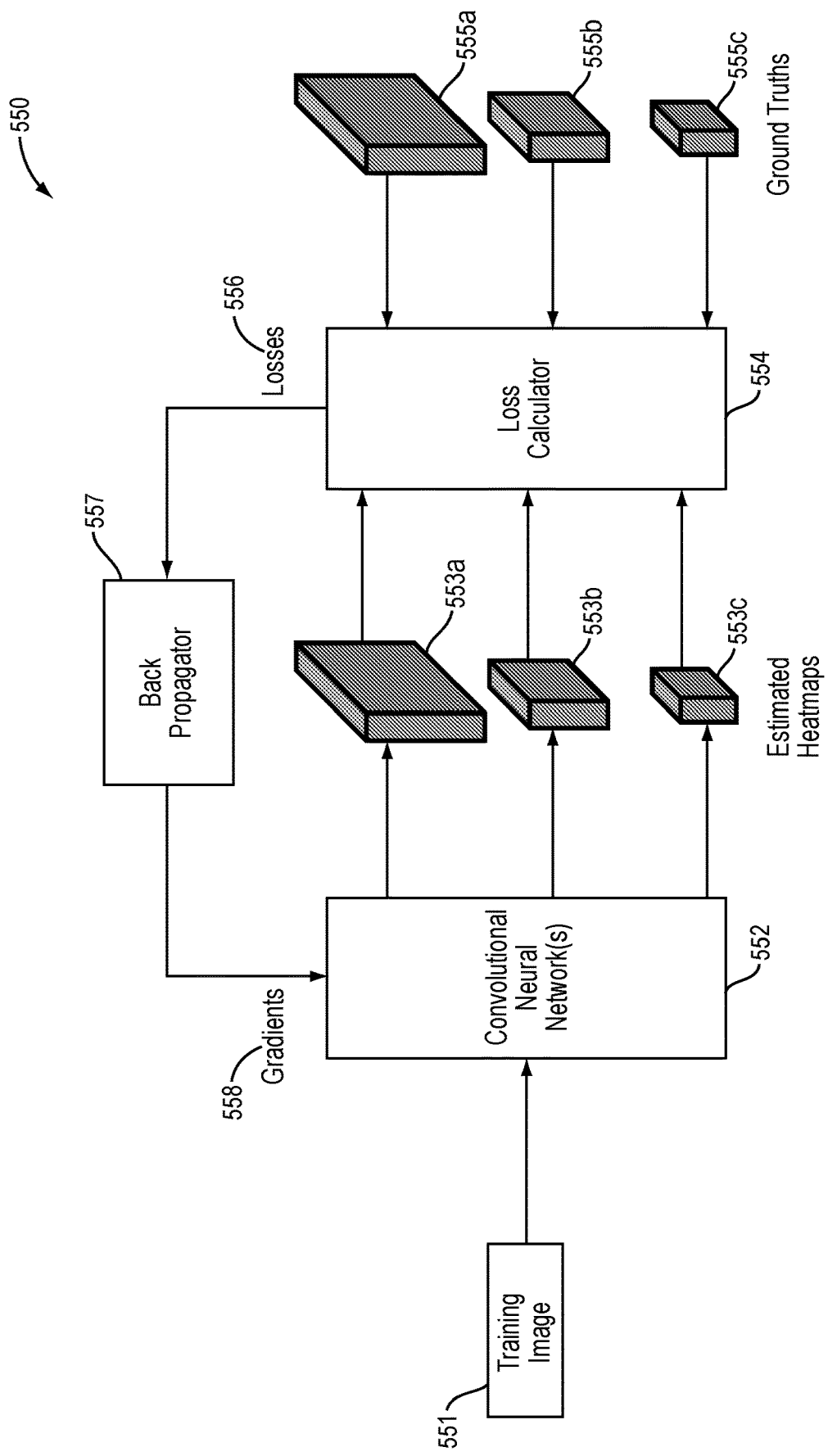
FIG. 5 is a simplified diagram of an embodiment that trains a neural network.

FIG. 5 is a system 550 for training the neural network(s) 552 according to an embodiment. The neural network(s) 552 trained in the system 550 may be any and/or all of the networks in FIGS. 4A-B.

The system 550 begins with the convolutional neural network(s) 552 processing the training image 551 to generate the estimated heatmaps 553a-c which are indications of joints in the training image 551. The heatmaps 553a-c are compared to respective ground-truth heatmaps 555a-c by the loss calculator 554 to calculate the losses 556. The ground-truth heatmaps 555a-c are known accurate indications of joints in the training image 551. According to an embodiment, each respective ground-truth heatmap 555a-c has the same respective scale as the estimated heatmaps 553a-c. As such, the heatmap 553a and ground truth 555a have the same scale, the heat map 553b and ground truth 555b have the same scale, and the heatmap 553c and ground truth 555c have the same scale.

To continue, the loss calculator 554 forwards the losses 556 to the back propagator 557 and the back propagator 557 determines the gradients 558. The gradients 558 are provided to the convolutional neural network(s) 552 so that weights of the neural network(s) 552 are adjusted and, in future iterations, results (e.g., the estimated heatmaps 553a-c) generated by the neural network(s) 552 are closer to the ground-truths 555a-c.

Embodiments implement a novel light-weight deep neural network with multi-scale heatmap fusion that is particularly optimized for fast pose estimation applications. An embodiment introduces light-weight modular design for multi-scale feature extraction, heatmap estimation, and fusion. Embodiments significantly reduce the complexity of deep neural networks and solve the scaling problem in pose estimation. As a result, embodiments of the present invention greatly reduce the running time required for pose estimation while maintaining a comparable accuracy with existing state-of-the-art methods. Embodiments can be deployed on mobile devices and achieve real-time and accurate pose estimation performance. Advantageously, embodiments can be easily adapted to different network architectures because the described neural networks have an expandable modular design.

An example embodiment of the invention uses a low-rank approach pose estimation framework that reduces computational costs (in FLOPs) by more than 70% FLOPs and reduces parameters by over 85% while providing comparable accuracy compared with the state-of-the-art methods. Another embodiment applies a backward loop to reconstruct a previous pose estimation from current frames to improve robustness and minimize inconsistent estimation. A novel head structure for pose estimation is also employed in an example embodiment. An example embodiment extracts multi-scale features from an input image and estimates multi-scale joint heatmaps from those feature maps. Then, those multi-scale estimations are fused together to produce a final estimation. This approach solves a scaling problem of pose estimation.

Advantageously, embodiments of the invention run much faster compared to state-of-the-art methods and achieve comparable accuracy. Example embodiments of the invention have been implemented in mobile devices and run in real-time with robust and accurate performance. An example embodiment of the invention solves a scaling problem of pose estimation by utilizing multi-scale feature extraction, feature fusion, and multi-scale heatmap estimation and fusion mechanisms.

Embodiments can be employed in numerous commercial applications. For instance, embodiments can be applied in detecting human behaviors in monitoring systems and embodiments can be applied for human-computer interaction such as in video games which use human body movement as input (e.g., Xbox Kinect). Embodiments can also be applied in many interesting mobile apps that require human body movement as input such as personal fitting and training.

Figure 6:
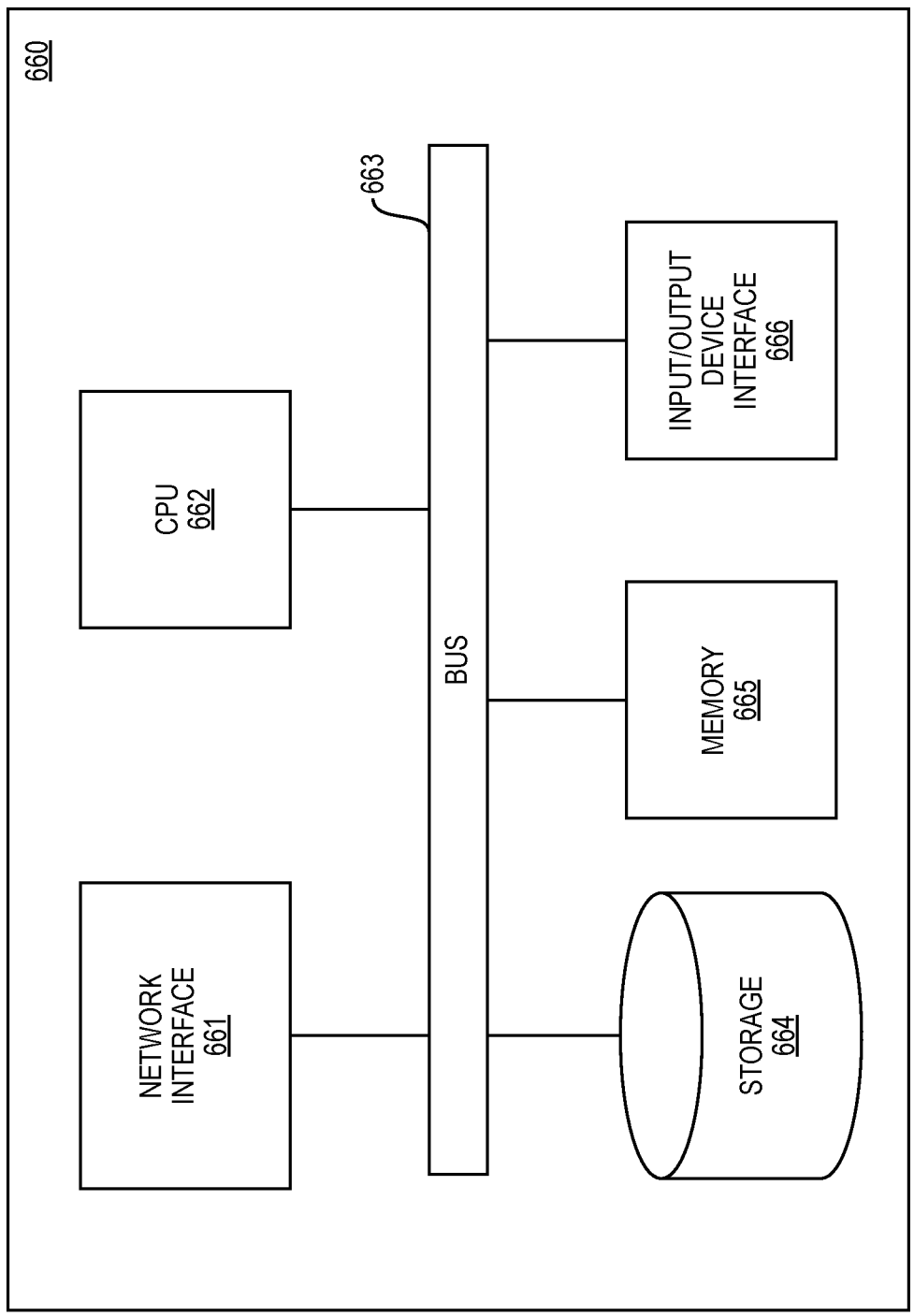
FIG. 6 is a simplified block diagram of a computer system for identifying joints of a multi-limb body in an image according to an embodiment.

FIG. 6 is a simplified block diagram of a computer-based system 660 that may be used to implement any variety of the embodiments of the present invention described herein. The system 660 comprises a bus 663. The bus 663 serves as an interconnect between the various components of the system 660. Connected to the bus 663 is an input/output device interface 666 for connecting various input and output devices such as a keyboard, mouse, display, speakers, etc. to the system 660. A central processing unit (CPU) 662 is connected to the bus 663 and provides for the execution of computer instructions implementing embodiments. Memory 665 provides volatile storage for data used for carrying out computer instructions implementing embodiments described herein, such as those embodiments previously described hereinabove. Storage 664 provides non-volatile storage for software instructions, such as an operating system (not shown) and embodiment configurations, etc. The system 660 also comprises a network interface 661 for connecting to any variety of networks known in the art, including wide area networks (WANs) and local area networks (LANs).

It should be understood that the example embodiments described herein may be implemented in many different ways. In some instances, the various methods and systems described herein may each be implemented by a physical, virtual, or hybrid general purpose computer, such as the computer system 660, or a computer network environment such as the computer environment 770, described herein below in relation to FIG. 7. The computer system 660 may be transformed into the systems that execute the methods described herein, for example, by loading software instructions into either memory 665 or non-volatile storage 664 for execution by the CPU 662. One of ordinary skill in the art should further understand that the system 660 and its various components may be configured to carry out any embodiments or combination of embodiments of the present invention described herein. Further, the system 660 may implement the various embodiments described herein utilizing any combination of hardware, software, and firmware modules operatively coupled, internally, or externally, to the system 660.

Figure 7:
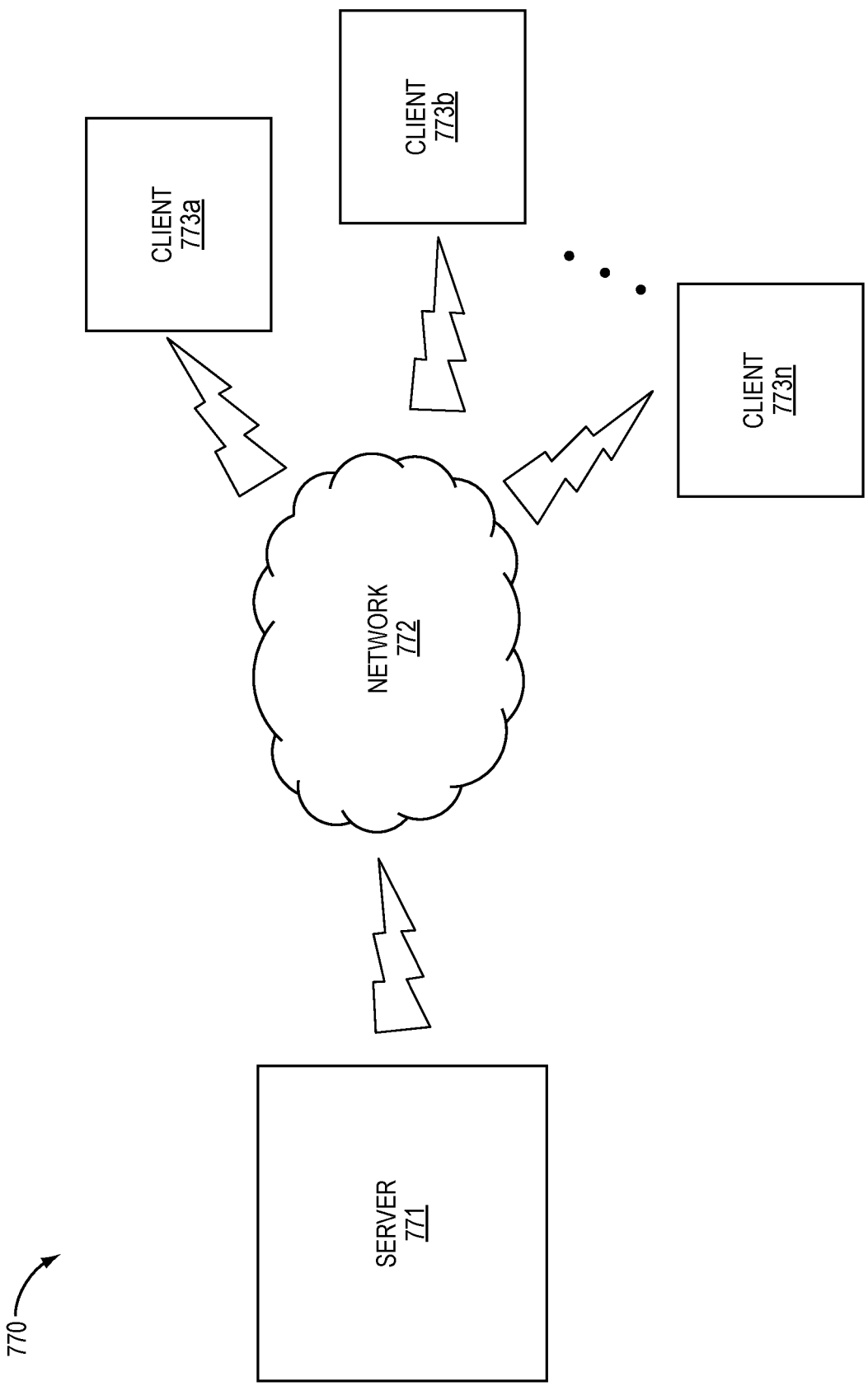
FIG. 7 is a simplified diagram of a computer network environment in which an embodiment of the present invention may be implemented.

FIG. 7 illustrates a computer network environment 770 in which an embodiment of the present invention may be implemented. In the computer network environment 770, the server 771 is linked through the communications network 772 to the clients 773a-n. The environment 770 may be used to allow the clients 773a-n, alone or in combination with the server 771, to execute any of the embodiments described herein. For non-limiting example, computer network environment 770 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[1] Alejandro Newell, Kaiyu Yang, and Jia Deng. Stacked hourglass networks for human pose estimation. In *European Conference on Computer Vision*, pages 483-499. Springer, 2016.

[2] Zhe Cao, Tomas Simon, Shih-En Wei, and Yaser Sheikh. Realtime multi-person 2d pose estimation using part affinity fields. In *Proceedings of the IEEE Conference on Computer Vision and Pattern Recognition*, pages 7291-7299, 2017.

[3] Ke Sun, Bin Xiao, Dong Liu, and Jingdong Wang. Deep high-resolution representation learning for human pose estimation. In *CVPR*, 2019.

[4] Karen Simonyan and Andrew Zisserman. Very deep convolutional networks for large-scale image recognition. *ICLR*, 2015.

[5] Kaiming He, Xiangyu Zhang, Shaoqing Ren, and Jian Sun. Deep residual learning for image recognition. In *CVPR*, pages 770-778, 2016.

[6] Andrew G Howard, Menglong Zhu, Bo Chen, Dmitry Kalenichenko, Weijun Wang, Tobias Weyand, Marco Andreetto, and Hartwig Adam. Mobilenets: Efficient convolutional neural networks for mobile vision applications. *CoRR*, abs/1704.04861, 2017.

[7] Xavier Glorot, Antoine Bordes, and Yoshua Bengio. Deep sparse rectifier neural networks. In *AISTATS*, pages 315-323, 2011.

[8] Jonghoon Jin, Aysegul Dundar, and Eugenio Culurciello. Flattened convolutional neural networks for feedforward acceleration. *CoRR*, 2014.

[9] Laurent Sifre and PS Mallat. *Rigid-motion scattering for image classification*. PhD thesis, Citeseer, 2014.
[10] Sergey Ioffe and Christian Szegedy. Batch normalization: Accelerating deep network training by reducing internal covariate shift. *ICML*, 2015.
[11] Francois Chollet. Xception: Deep learning with depthwise separable convolutions. In *CVPR*, pages 1251-1258, 2017.
[12] Mark Sandler, Andrew Howard, Menglong Zhu, Andrey Zhmoginov, and Liang-Chieh Chen. Inverted residuals and linear bottlenecks: Mobile networks for classification, detection and segmentation. *CVPR*, 2018.
[13] Xiangyu Zhang, Xinyu Zhou, Mengxiao Lin, and Jian Sun. Shufflenet: An extremely efficient convolutional neural network for mobile devices. In *CVPR*, 2018.
[14] Ningning Ma, Xiangyu Zhang, Hai-Tao Zheng, and Jian Sun. Shufflenet v2: Practical guidelines for efficient cnn architecture design. In *ECCV*, pages 122-138, 2018.
[15] Gao Huang, Shichen Liu, Laurens van der Maaten, and Kilian Q. Weinberger. Condensenet: An efficient densenet using learned group convolutions. In *CVPR*, June 2018.
[16] Hanxiao Liu, Karen Simonyan, and Yiming Yang. Darts: Differentiable architecture search. In *ICLR*, 2019.
[17] Barret Zoph, Vijay Vasudevan, Jonathon Shlens, and Quoc V Le. Learning transferable architectures for scalable image recognition. In *CVPR*, pages 8697-8710, 2018.
[18] Chenxi Liu, Barret Zoph, Maxim Neumann, Jonathon Shlens, Wei Hua, Li-Jia Li, Li Fei-Fei, Alan Yuille, Jonathan Huang, and Kevin Murphy. Progressive neural architecture search. In *ECCV*, pages 19-34, 2018.
[19] Han Cai, Ligeng Zhu, and Song Han. Proxylessnas: Direct neural architecture search on target task and hardware. In *ICLR*, 2019.
[20] Bichen Wu, Xiaoliang Dai, Peizhao Zhang, Yanghan Wang, Fei Sun, Yiming Wu, Yuandong Tian, Peter Vajda, Yangqing Jia, and Kurt Keutzer. Fbnet: Hardware-aware efficient convnet design via differentiable neural architecture search. In *CVPR*, pages 10734-10742, 2019.
[21] Mingxing Tan, Bo Chen, Ruoming Pang, Vijay Vasudevan, and Quoc V Le. Mnasnet: Platformaware neural architecture search for mobile. In *CVPR*, 2019.
[22] Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In *ICCV*, 2019.
[23] Mingxing JTan and Quoc V Le. Mixnet: Mixed depthwise convolutional kernels. In *BMVC*, 2019.
[24] Ming Yuan and Yi Lin. Model selection and estimation in regression with grouped variables. *Journal of the Royal Statistical Society: Series B (Statistical Methodology)*, 68(1):49-67, 2006.
[25] Max Jaderberg, Andrea Vedaldi, and Andrew Zisserman. Speeding up convolutional neural networks with low rank expansions. In *BMVC*, 2014.
[26] Yifan Sun, Liang Zheng, Weijian Deng, and Shengjin Wang. Svdnet for pedestrian retrieval. *ICCV*, 2017.
[27] Ting Zhang, Guo-Jun Qi, Bin Xiao, and Jingdong Wang. Interleaved group convolutions. In *ICCV*, pages 4373-4382, 2017.
[28] Guotian Xie, Jingdong Wang, Ting Zhang, Jianhuang Lai, Richang Hong, and Guo-Jun Qi. Interleaved structured sparse convolutional neural networks. In *CVPR*, June 2018.
[29] Ke Sun, Mingjie Li, Dong Liu, and Jingdong Wang. Igcv3: Interleaved low-rank group convolutions for efficient deep neural networks. 2018.
[30] Mykhaylo Andriluka, Stefan Roth, and Bernt Schiele. Pictorial structures revisited: People detection and articulated pose estimation. In *Computer Vision and Pattern Recognition, 2009. CVPR 2009. IEEE Conference on*, pages 1014-1021. IEEE, 2009.
[31] Georgia Gkioxari, Pablo Arbeláez, Lubomir Bourdev, and Jitendra Malik. Articulated pose estimation using discriminative armlet classifiers. In *Computer Vision and Pattern Recognition (CVPR), 2013 IEEE Conference on*, pages 3342-3349. IEEE, 2013.
[32] Yi Yang and Deva Ramanan. Articulated pose estimation with flexible mixtures-of-parts. In *Computer Vision and Pattern Recognition (CVPR), 2011 IEEE Conference on*, pages 1385-1392. IEEE, 2011.
[33] Sam Johnson and Mark Everingham. Learning effective human pose estimation from inaccurate annotation. In *Computer vision and pattern recognition (CVPR), 2011 IEEE conference on*, pages 1465-1472. IEEE, 2011.
[34] Xianjie Chen and Alan L Yuille. Articulated pose estimation by a graphical model with image dependent pairwise relations. In *Advances in neural information processing systems*, pages 1736-1744, 2014.
[35] Kaiming He, Georgia Gkioxari, Piotr Dollár, and Ross Girshick. Mask r-cnn. In *Computer Vision (ICCV), 2017 IEEE International Conference on*, pages 2980-2988. IEEE, 2017.
[36] George Papandreou, Tyler Zhu, Nori Kanazawa, Alexander Toshev, Jonathan Tompson, Chris Bregler, and Kevin Murphy. Towards accurate multi-person pose estimation in the wild. In *Proceedings of the IEEE Conference on Computer Vision and Pattern Recognition*, pages 4903-4911, 2017.
[37] Haoshu Fang, Shuqin Xie, Yu-Wing Tai, and Cewu Lu. Rmpe: Regional multi-person pose estimation. In *The IEEE International Conference on Computer Vision (ICCV)*, volume 2, 2017.
[38] Leonid Pishchulin, Eldar Insafutdinov, Siyu Tang, Bjoern Andres, Mykhaylo Andriluka, Peter V Gehler, and Bernt Schiele. Deepcut: Joint subset partition and labeling for multi person pose estimation. In *Proceedings of the IEEE Conference on Computer Vision and Pattern Recognition*, pages 4929-4937, 2016.
[39] Alejandro Newell, Zhiao Huang, and Jia Deng. Associative embedding: End-to-end learning for joint detection and grouping. In *Advances in Neural Information Processing Systems*, pages 2274-2284, 2017.
[40] Xuecheng Nie, Jiashi Feng, Jianfeng Zhang, and Shuicheng Yan. Single-stage multi-person pose machines. In *Proceedings of the IEEE International Conference on Computer Vision*, pages 6951-6960, 2019.

What is claimed is:

1. A computer-implemented method of identifying joints of a multi-limb body in an image, the method comprising:
creating a plurality of feature maps each having a same depth by unifying depth of a plurality of feature maps generated from an image of a multi-limb body, wherein each feature map of the plurality of feature maps generated from the image has a respective scale;
for each of the plurality of feature maps having the same depth, generating an initial indication of one or more joints in the image, the one or more joints being located at an interconnection of a limb to the multi-limb body or at an interconnection of a limb to another limb; and
generating a final indication of the one or more joints in the image using each generated initial indication of the one or more joints.

2. The computer-implemented method of claim 1 further comprising:
from the generated final indication of the one or more joints in the image, generating an indication of one or more limbs in the image.

3. The computer-implemented method of claim 2 further comprising:
generating an indication of pose using the generated final indication of the one or more joints in the image and the generated indication of the one or more limbs in the image.

4. The computer-implemented method of claim 1 wherein generating the final indication of the one or more joints in the image comprises:
upsampling at least one initial indication of the one or more joints in the image to have a scale equivalent to a scale of a given initial indication of the one or more joints with a largest scale; and
adding together (i) the upsampled at least one initial indication of the one or more joints and (ii) the given initial indication of the one or more joints with the largest scale, to generate the final indication of the one or more joints in the image.

5. The method of claim 1 wherein unifying depth of the plurality of feature maps generated from the image comprises:
applying a respective convolutional layer to each of the plurality of feature maps generated from the image to create the plurality of feature maps each having the same depth.

6. The method of claim 1 wherein generating the initial indication of the one or more joints in the image for each of the plurality of feature maps having the same depth comprises:
applying a heatmap estimating layer to each of the plurality of feature maps having the same depth to generate each initial indication of the one or more joints in the image.

7. The method of claim 6 wherein the heatmap estimating layer is composed of a convolutional neural network.

8. The method of claim 7 wherein the image is a training image and the method further comprises:
training the convolutional neural network by comparing each generated initial indication of the one or more joints in the image to a respective ground-truth indication of the one or more joints in the training image to determine losses and back propagating the losses to the convolutional neural network, wherein each respective ground-truth indication of the one or more joints corresponds to a respective scale of a given feature map of the plurality of feature maps having the same depth.

9. The method of claim 1 further comprising:
generating the plurality of feature maps generated from the image by processing the image using a backbone neural network.

10. The method of claim 9 wherein processing the image using the backbone neural network comprises:
performing multi-scale feature extraction and multi-scale feature fusion to generate the plurality of feature maps from the image.

11. A computer system for identifying joints of a multi-limb body in an image, the computer system comprising:
a processor; and
a memory with computer code instructions stored thereon, the processor and the memory, with the computer code instructions, being configured to cause the system to:
create a plurality of feature maps each having a same depth by unifying depth of a plurality of feature maps generated from an image of a multi-limb body, wherein each feature map of the plurality of feature maps generated from the image has a respective scale;
for each of the plurality of feature maps having the same depth, generate an initial indication of one or more joints in the image, the one or more joints being located at an interconnection of a limb to the multi-limb body or at an interconnection of a limb to another limb; and
generate a final indication of the one or more joints in the image using each generated initial indication of the one or more joints.

12. The system of claim 11 wherein the processor and the memory, with the computer code instructions, are further configured to cause the system to:
from the generated final indication of the one or more joints in the image, generate an indication of one or more limbs in the image.

13. The system of claim 12 wherein the processor and the memory, with the computer code instructions, are further configured to cause the system to:
generate an indication of pose using the generated final indication of the one or more joints in the image and the generated indication of the one or more limbs in the image.

14. The system of claim 11 wherein, in generating the final indication of the one or more joints in the image, the processor and the memory, with the computer code instructions, are further configured to cause the system to:
upsample at least one initial indication of the one or more joints in the image to have a scale equivalent to a scale of a given initial indication of the one or more joints with a largest scale; and
add together (i) the upsampled at least one initial indication of the one or more joints and (ii) the given initial indication of the one or more joints with the largest scale, to generate the final indication of the one or more joints in the image.

15. The system of claim 11 wherein, in unifying depth of the plurality of feature maps generated from the image, the processor and the memory, with the computer code instructions, are further configured to cause the system to:
apply a respective convolutional layer to each of the plurality of feature maps generated from the image to create the plurality of feature maps each having the same depth.

16. The system of claim 11 wherein, in generating the initial indication of the one or more joints in the image for each of the plurality of feature maps having the same depth, the processor and the memory, with the computer code instructions, are further configured to cause the system to:
apply a heatmap estimating layer, composed of a convolutional neural network, to each of the plurality of feature maps having the same depth to generate each initial indication of the one or more joints in the image.

17. The system of claim 16 wherein the image is a training image and the processor and the memory, with the computer code instructions, are further configured to cause the system to:
train the convolutional neural network by comparing each generated initial indication of the one or more joints in the image to a respective ground-truth indication of the one or more joints in the training image to determine losses and back propagating the losses to the convolutional neural network, wherein each respective ground-truth indication of the one or more joints corresponds to a respective scale of a given feature map of the plurality of feature maps having the same depth.

18. The system of claim 11 wherein the processor and the memory, with the computer code instructions, are further configured to cause the system to:
generate the plurality of feature maps generated from the image by processing the image using a backbone neural network.

19. The system of claim 18 wherein, in processing the image using the backbone neural network, the processor and the memory, with the computer code instructions, are further configured to cause the system to:
perform multi-scale feature extraction and multi-scale feature fusion to generate the plurality of feature maps from the image.

20. A computer program product for identifying joints of a multi-limb body in an image, the computer program product comprising:
one or more non-transitory computer-readable storage devices and program instructions stored on at least one of the one or more storage devices, the program instructions, when loaded and executed by a processor, cause an apparatus associated with the processor to:
create a plurality of feature maps each having a same depth by unifying depth of a plurality of feature maps generated from an image of a multi-limb body, wherein each feature map of the plurality of feature maps generated from the image has a respective scale;
for each of the plurality of feature maps having the same depth, generate an initial indication of one or more joints in the image, the one or more joints being located at an interconnection of a limb to the multi-limb body or at an interconnection of a limb to another limb; and
generate a final indication of the one or more joints in the image using each generated initial indication of the one or more joints.

* * * * *